US 9,798,473 B2

(12) United States Patent
Standing

(10) Patent No.: US 9,798,473 B2
(45) Date of Patent: Oct. 24, 2017

(54) STORAGE VOLUME DEVICE AND METHOD FOR INCREASING WRITE SPEED FOR DATA STREAMS WHILE PROVIDING DATA PROTECTION

(71) Applicant: OWC Holdings, Inc., Austin, TX (US)

(72) Inventor: Timothy Standing, Mill Valley, CA (US)

(73) Assignee: OWC Holdings, Inc., Austin, TX (US)

(*) Notice: Subject to any disclaimer, the term of this patent is extended or adjusted under 35 U.S.C. 154(b) by 83 days.

(21) Appl. No.: 14/927,383

(22) Filed: Oct. 29, 2015

(65) Prior Publication Data
US 2017/0123654 A1 May 4, 2017

(51) Int. Cl.
G06F 12/00 (2006.01)
G06F 3/06 (2006.01)
G06F 13/00 (2006.01)
G06F 13/28 (2006.01)

(52) U.S. Cl.
CPC .............. *G06F 3/061* (2013.01); *G06F 3/064* (2013.01); *G06F 3/0619* (2013.01); *G06F 3/0653* (2013.01); *G06F 3/0689* (2013.01)

(58) Field of Classification Search
CPC ...... G06F 3/061; G06F 3/0689; G06F 3/0619; G06F 3/064; G06F 3/0653
See application file for complete search history.

(56) References Cited

U.S. PATENT DOCUMENTS

| | | | |
|---|---|---|---|
| 6,044,439 A | 3/2000 | Ballard et al. | |
| 7,487,235 B2 | 2/2009 | Andrews et al. | |
| 8,751,861 B2 | 6/2014 | Nair et al. | |
| 8,898,381 B2 | 11/2014 | Leach et al. | |
| 2005/0055521 A1 | 3/2005 | Saika | |
| 2007/0130432 A1 | 6/2007 | Aigo | |
| 2009/0271659 A1 | 10/2009 | Troppens et al. | |
| 2011/0167216 A1 | 7/2011 | Huang et al. | |
| 2011/0202792 A1 | 8/2011 | Atzmony | |
| 2012/0047330 A1 | 2/2012 | Rago et al. | |

OTHER PUBLICATIONS

PCT International Search Report and Written Opinion dated Dec. 1, 2016 in corresponding PCT Application No. PCT/US2016/050664.

*Primary Examiner* — Mark Giardino, Jr.
(74) *Attorney, Agent, or Firm* — Lessani Law Group, PC

(57) ABSTRACT

The present disclosure describes a method for increasing the write speed for data streams on storage volumes, such as RAID volumes, by delaying the extra operations associated with data protection when one or more data streams are written to the storage volume. Specifically, in response to a storage volume receiving a data block for writing to the volume, the storage volume determines whether the data block is part of a larger data stream. If the data block is part of a larger data stream, the data block is written to the volume, but the steps of creating volume recovery data is delaying until a period of low activity on the storage volume in order to maximize write speed for the data stream. When a low period of activity (e.g., below a threshold level) is detected, volume recovery data is created for the data block and written to the volume.

21 Claims, 8 Drawing Sheets

STORAGE VOLUME DEVICE AND METHOD FOR INCREASING WRITE SPEED FOR DATA STREAMS WHILE PROVIDING DATA PROTECTION

BACKGROUND OF THE INVENTION

1. Field of the Invention

This invention relates generally to storage volumes with multiple hard disk drives or solid state drives, and, more particularly, to increasing write speed on a storage volume while providing data protection.

2. Description of the Background Art

Most RAID storage devices provide protection from disk failure. If a disk fails on a RAID volume, all data on the volume is still available. This protection comes from either storing a redundant copy of the volume's data (e.g., RAID 1 and RAID 1+0) or calculating and storing parity information for each block of data on the volume (e.g., RAID 4, 5, 6, and DP). When a disk fails on one of these RAID volumes, the volume's data can be recovered by either reading it from the redundant copy or creating the data that was on the failed disk by using the remaining disks and the parity information stored for each block of data.

On RAID volumes that offer data protection, there are extra steps that must be taken every time data is written to the volume in order provide such data protection. These steps are either writing the redundant copies of data out to additional disks or calculating and writing out the parity information. With hard disks (i.e., disks with mechanical arms and rotating media), these steps are only a small percentage of the total time taken for a write, and they have only a small impact on the write performance of a RAID volume. With faster disks, such as SSD (Solid State Disks with use memory chips rather than rotating media), the percentage of time taken for the extra steps increases. With these disks, the extra steps required for write operations result in write performance that is dramatically slower than read performance, and there is a need to increase write speed on such disks while still performing the extra steps that provide data protection.

SUMMARY OF THE DISCLOSURE

The present disclosure describes a method for increasing the write speed for data streams on storage volumes, such as RAID volumes, by delaying the extra operations associated with data protection when one or more data streams are written to the storage volume. Specifically, in response to a storage volume receiving a data block for writing to the volume, the storage volume determines whether the data block is part of a larger data stream. A data stream comprises multiple, large contiguous blocks of data that are written out sequentially. If the data block is not part of a larger data stream, the data block is written to the volume (i.e., to one or more drives within the volume) and volume recovery data is created and stored.

If the data block is part of a larger data stream, the data block is written to the volume, but the step of creating volume recovery data is delayed until a period of low activity on the storage volume. This maximizes write speed for the data stream. When a low period of activity (i.e., below a threshold level) is detected, volume recovery data is created for the data block and written to the volume.

In certain embodiments, creating volume recovery data comprises calculating and storing parity information for the data block, and, in other embodiments, creating volume recovery data comprises storing a redundant copy of the data block on another set of drives within the storage volume (i.e., a set of drives other than the drives on which the original data block is stored).

In certain embodiments, the storage volume maintains a volume-recovery-data state that indicates data blocks for which volume recovery data needs to be created.

In certain embodiments, determining whether the data block is part of a larger data stream comprises determining whether (1) the data block exceeds a threshold size and (2) is contiguous with a data block recently written to the storage volume. In other embodiments, determining whether the data block is part of a larger data stream simply involves determining whether the data block exceeds a threshold size.

DETAILED DESCRIPTION OF THE PREFERRED EMBODIMENTS

As used herein, a storage volume is a system or device comprising a plurality of drives on which data can be stored, and a controller for controlling read, write, and data protection operations. "Drives" may be hard disk drives, solid state drives, or solid state storage devices.

Figure 1A:
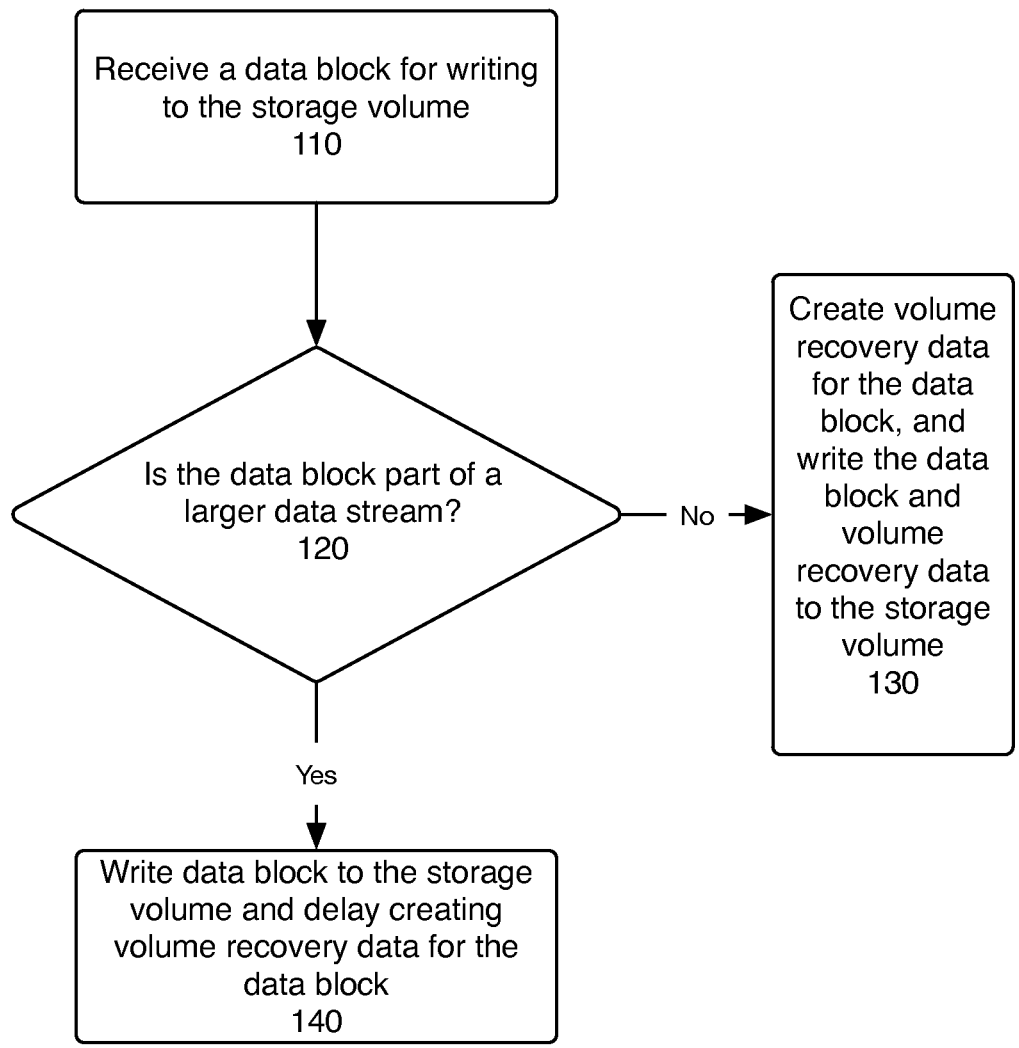
FIGS. 1A-1B are flowcharts that illustrates a method for increasing write speed for data streams on a storage volume.
Figure 1B:
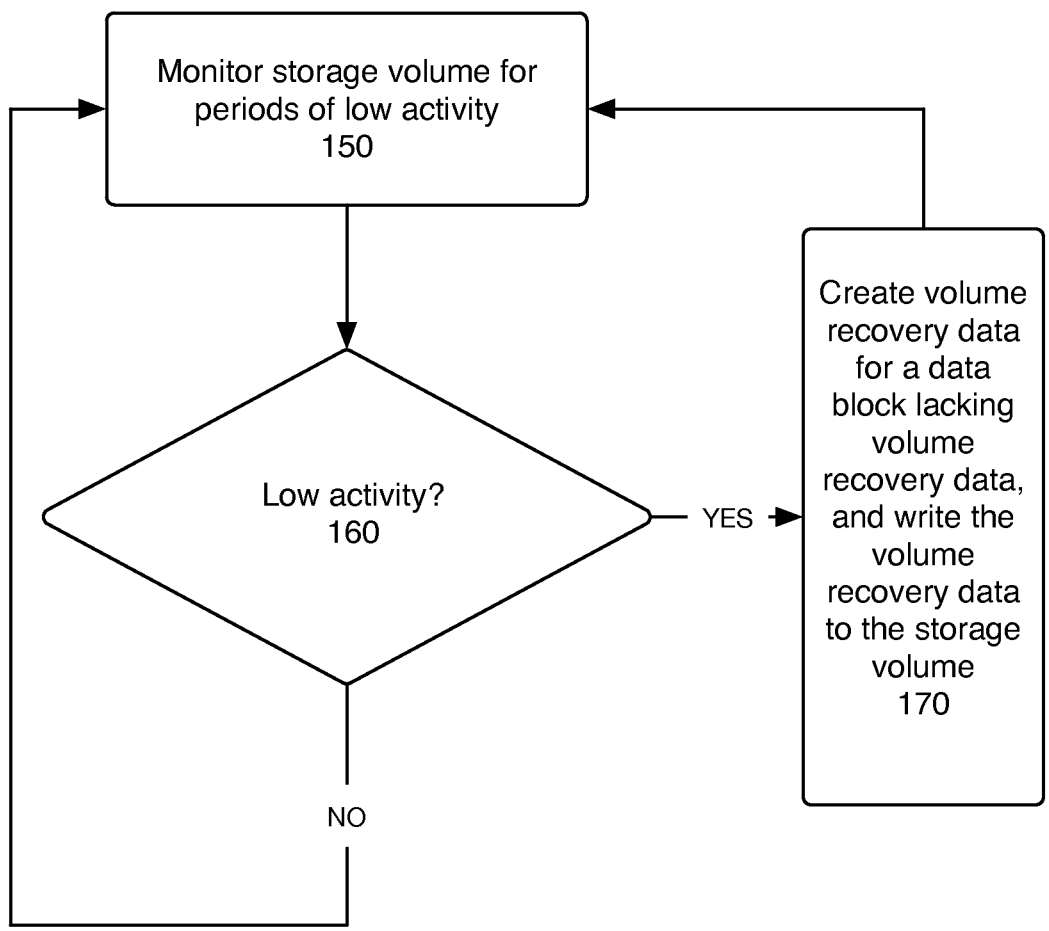

FIGS. 1A-1B illustrate a method, performed by the controller, for increasing write speed on a storage volume that provides data protection. In one embodiment, the steps illustrated in FIGS. 1A-1B are embodied in software or firmware, and the controller is a processor executing the software/firmware. However, those skilled in the art will appreciate that one or more steps may be embodied in hardware logic. FIGS. 1A and 1B are parallel processes.

Referring to FIG. 1A, the storage volume receives a data block for writing to the volume (step 110), and the controller determines whether the data block is part of a larger data stream (step 120). A data stream is a plurality of large, contiguous data blocks that are written out sequentially. Video files, digital photographs, and other large files are examples of media typically written out in data streams.

In one embodiment, the controller concludes that a data block is part of a larger data stream simply if the data block exceeds a threshold size (e.g., 1 megabyte). In an alternate embodiment, the data block must also be contiguous with a data block recently written to the storage volume (in addition to exceeding a threshold size).

In response to determining that the data block is not part of larger data stream, the controller writes the data block to one or more drives in the volume and creates and writes volume recovery data for the data block at substantially the same time or immediately after the write operation (e.g., less than 5 to 50 milliseconds afterwards) (step 130). In certain embodiments, creating volume recovery data comprises calculating parity information for the data block, and, in other embodiments, creating volume recovery data comprises creating a redundant copy of the data block. Parity information may be data created by an XOR operation, as well as more advanced error correcting codes used in dual parity volumes (e.g., RAID 6 and RAID DP).

In response to determining that the data block is part of a larger data stream, the controller writes the data to one or more drives in the volume and delays creating volume recovery data for the data block in order to maximize the write speed of the data stream (step 140).

Referring to FIG. 1B, which is performed in parallel with FIG. 1A, the controller continuously or periodically monitors for periods of low read and write activity on the storage volume (step 150). In response to detecting an activity level that is below or equal to a threshold (step 160), the controller creates and writes volume recovery data for a data block lacking volume recovery data (step 170). In other words, volume recovery data is created in step 170 for a data block for which creating volume recovery data was delayed in step 140. The foregoing method enables write speeds to be as fast are reads for data streams by delaying creation of volume recovery data until a period of low activity after the write operation.

In one embodiment, the activity threshold in step 160 is a certain number of read/write operations over a certain amount of time. For example, for a storage volume with hard disk drives, the threshold might be zero read/writes for five seconds or 20 read/writes for thirty seconds. In such case, step 160 would evaluate to positive if there have been no read/writes in the last five seconds, or there have been twenty or less read/writes in the last thirty seconds. For a storage volume with solid state drives, the threshold might be 50, 100, of 150 megabytes of writes for five seconds, such that step 160 would evaluate to positive if there was less than 50, 100, or 150 (whichever is applicable) megabytes of data written to the storage volume in the last five seconds. The above-described thresholds are just examples, and those skilled in the art will appreciate that a different threshold may be used.

Figure 2:
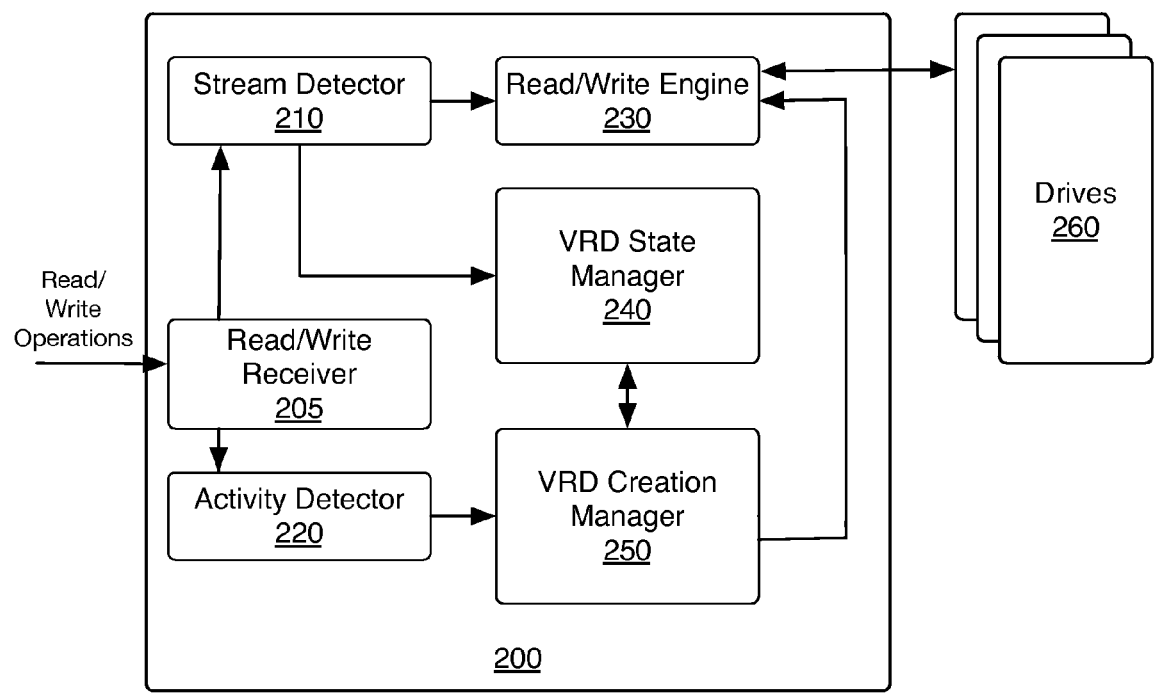
FIG. 2 is a block diagram that illustrates an example software architecture for a storage volume.
Figure 3A:
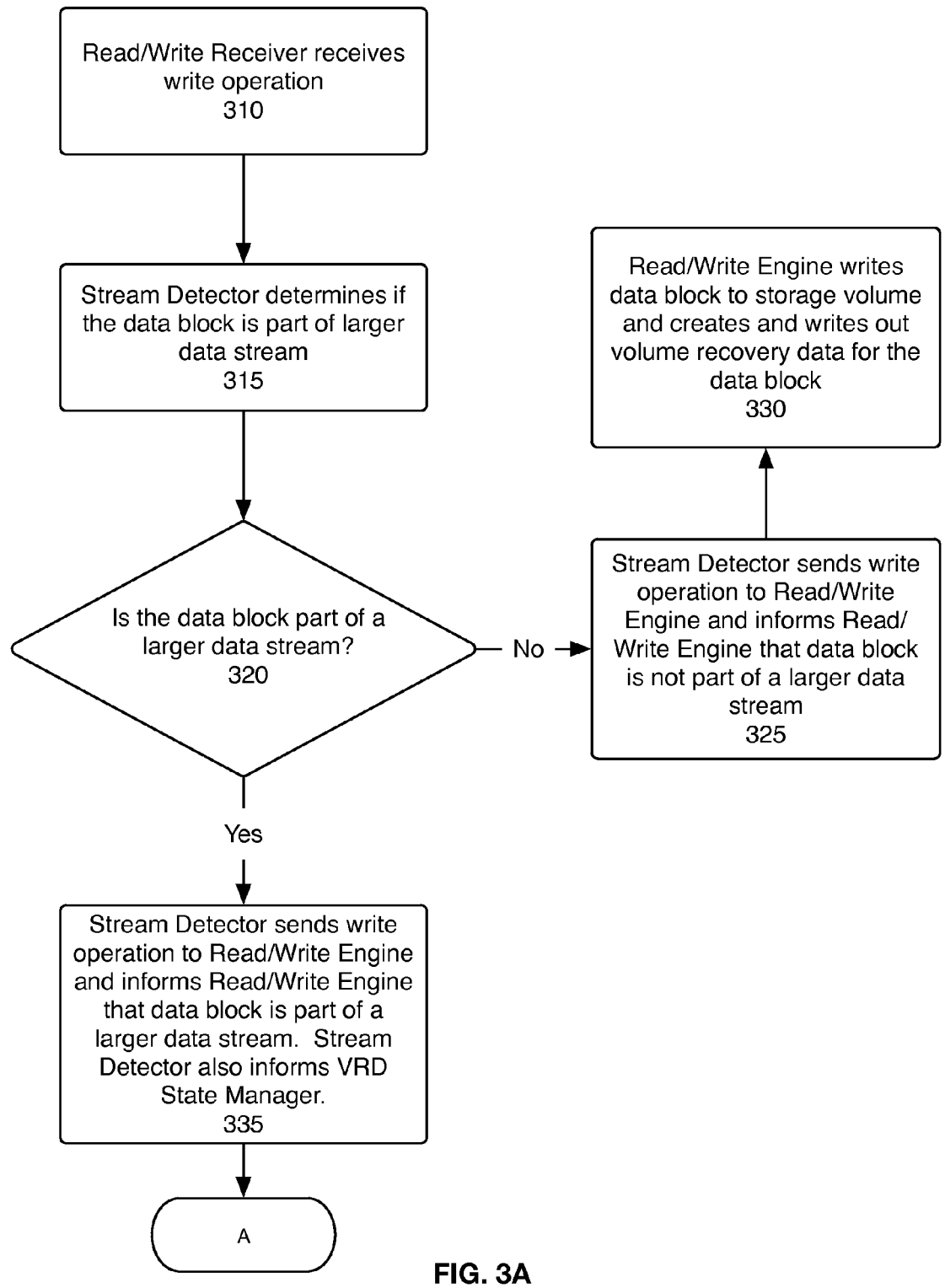
FIGS. 3A, 3B, and 4A-C are flowcharts that illustrate a method, according to one embodiment of the disclosure, for increasing write speed on a storage volume having the software architecture illustrated in FIG. 2.
Figure 3B:
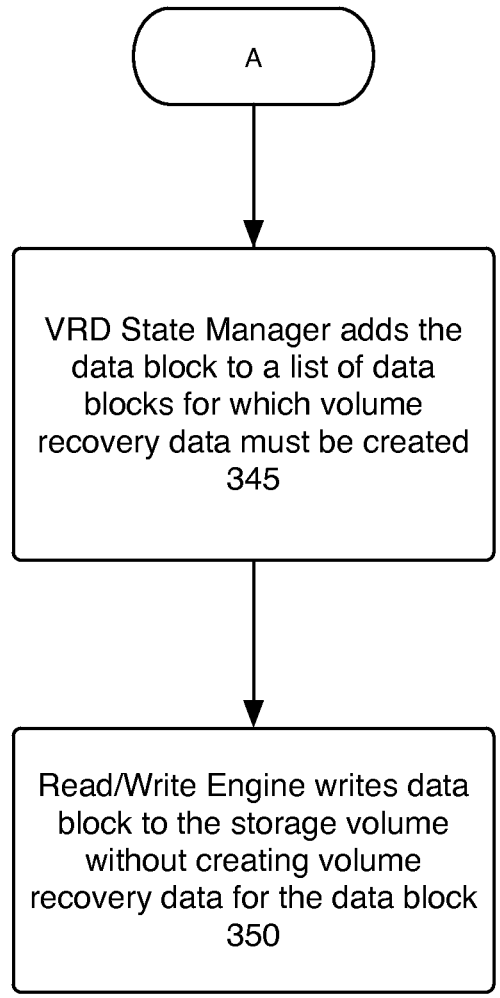

FIG. 2 illustrates an example software architecture for a controller according to one embodiment of a storage volume. As a person skilled in the art would understand, the controller may be architected other ways, and the method of FIGS. 1A and 1B are not limited to the architecture illustrated in FIG. 2.

As shown in FIG. 2, the controller includes a Read/Write Receiver 205, a Stream Detector 210, an Activity Detector 220, a Read/Write Engine 230, a Volume Recovery Data (VRD) State Manager 240, and a VRD Creation Manager 250. The Read/Write Engine 230 reads and writes data to drives 260.

FIGS. 3A-3B and FIGS. 4A-4C illustrate an example implementation of the method of FIG. 1, as well as the operation of the foregoing modules. FIGS. 3A-3B and FIGS. 4A-C are parallel processes. A write operation is received by the Read/Write Receiver 205 (step 310), which notifies the Stream Detector 210. The Stream Detector 210 examines the data block that is to be written and determines if the data block is part of a larger data stream (steps 315, 320). If the data block is not part of a larger data stream, the Stream Detector 210 sends the write operation to the Read/Write Engine 230 and informs the Read/Write Engine 230 that the data block is not part of a larger data stream (step 325). The Read/Write Engine 230 then writes the data block to the storage volume (i.e., to one or more drives in the storage volume), and it also creates and writes the volume recovery data for the data block to the storage volume at the same time or shortly thereafter (e.g., less than 5 to 50 milliseconds afterwards) (step 330).

If the data block is part of a larger data stream, the Stream Detector 210 sends the write operation to the Read/Write Engine 230 and informs the Read/Write Engine 230 that the data block is part of a larger data stream (step 335). The Stream Detector 210 also informs the VRD State Manager 240 that the data block is part of a larger data stream (step 335). The VRD State Manager 240, which maintains a volume-recovery-data state that indicates data blocks for which volume recovery data needs to be created, adds the data block to the list of data blocks lacking volume recovery data (step 345), and the Read/Write Engine 230 writes the data block to the storage volume without creating volume recovery data for the data block (step 350).

Figure 4A:
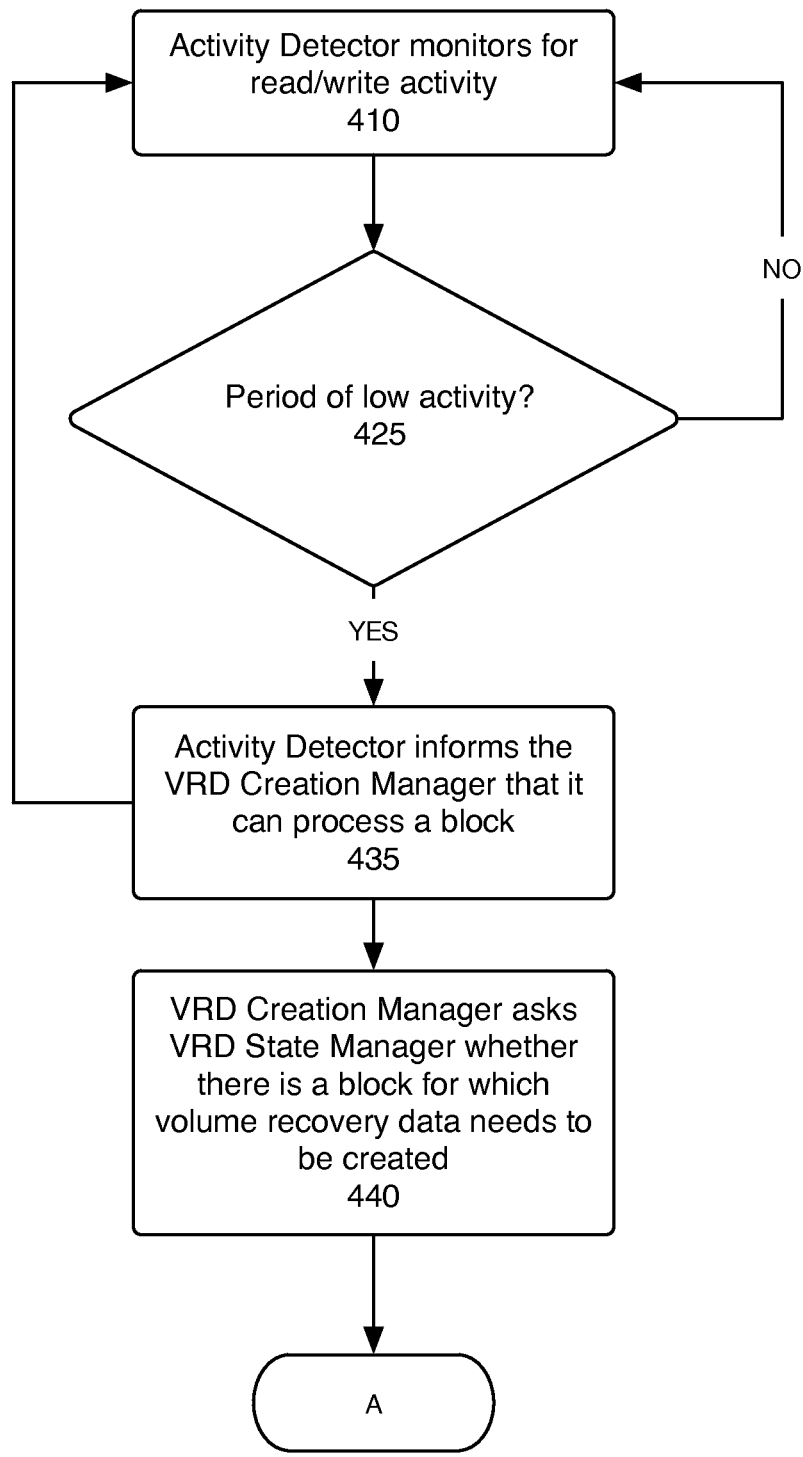
Figure 4B:
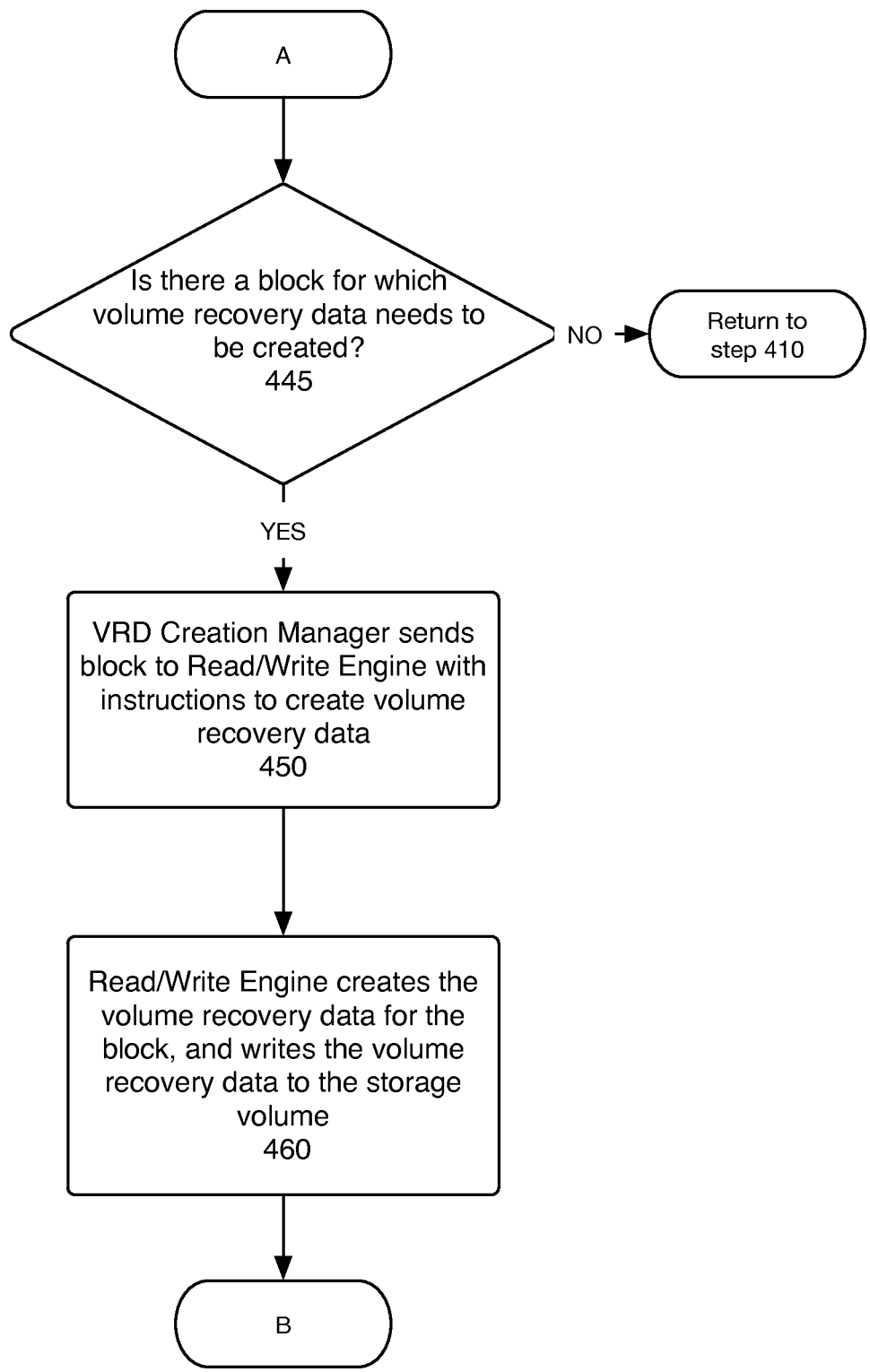
Figure 4C:
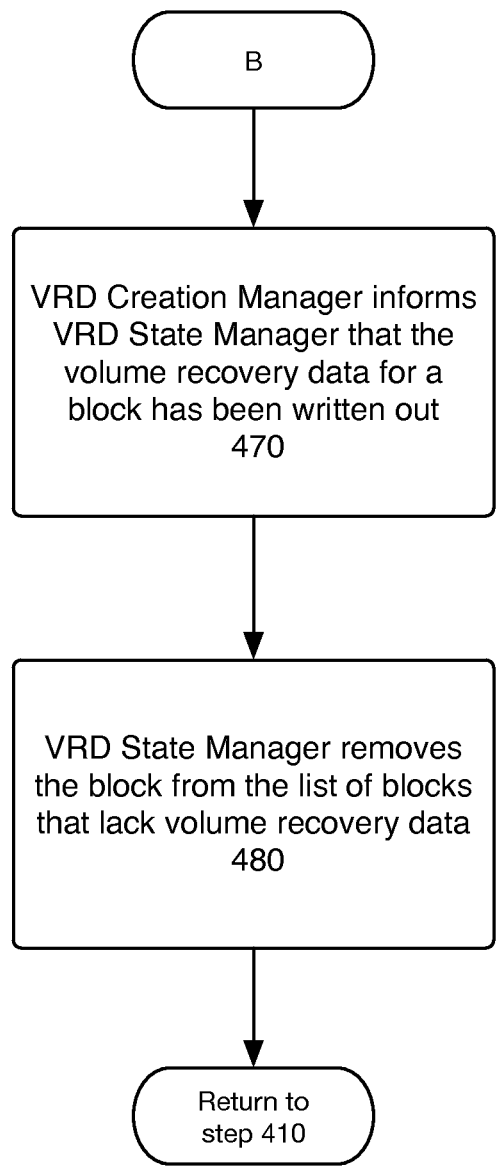

FIGS. 4A-4C illustrate a method for creating volume recovery data for those data blocks for which creation of such data was delayed. When the Read/Write Receiver 205 receives a read/write operation, it also forwards such operation to the Activity Detector 220, which continuously or periodically monitors the level of read/write activity on the storage volume (steps 410, 425). In response to a period of low activity (e.g., less than x read/writes over a period of y seconds), the Activity Detector 220 informs the VRD Creation Manager 250 that it can process one data block (step 435). The VRD Creation Manager 250 than asks the VRD State Manager 240 whether there is a data block lacking volume recovery data (step 440). The VRD State Manager 240 determines if there are any such data blocks (step 445), and, if there are no such data blocks, the VRD State Manager 240 informs the VRD Creation Manager 250 that there are no such data blocks. In such case, the VRD Creation Manager 250 does nothing, and the controller returns to step 410. If there is at least one data block that lacks volume recovery data, the VRD State Manager VRD informs the VRD Creation Manager 250 of the data block, and the VRD Creation Manager 250 instructs the Read/Write Engine 230 to create volume recovery data for the data block (step 450). The Read/Write Engine 230 reads the data block into a temporary buffer, creates the volume recovery data, and writes the volume recovery data to one or more drives in the volume (step 460).

The VRD Creation Manager 250 then informs the VRD State Manager 240 that the volume recovery data has been written out for the data block (step 470). The VRD State Manager 240 removes the data block from the list of data blocks that lack volume recovery data (step 480). The controller returns to step 410.

The methods described with respect to FIGS. 1-4C may be embodied in hardware logic or in software executed by one or more processors in the storage volume device. A storage volume device with a processor is a type of computer system, and a person skilled in the art would understand that a computer system has one or more memory units, disks, drives, or other physical, computer-readable storage media for storing software instructions.

The methods described with respect to FIGS. 1-4C can be applied to systems that write out multiple data streams simultaneously. In such cases, the method is applied to each of the parallel write processes.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method for increasing write speed, while providing data protection, on a storage volume comprising multiple drives, the method comprising:
   receiving a data block for writing to the storage volume;
   determining whether the data block is part of a larger data stream;
   in response to determining that the data block is not part of a larger data stream and irrespective of the level of activity on the storage volume, writing the data block to one or more of the drives, and creating and writing volume recovery data for the data block at substantially the same time or immediately afterwards; and
   in response to determining that the data block is part of a larger data stream, performing the following:
      writing the data block to one or more of the drives and delaying creating volume recovery data for the data block until a low period of activity on the storage volume in order to maximize write speed for the data stream;
      monitoring the storage volume for activity below a threshold level; and
      in response to the storage volume activity being below the threshold level, creating volume recovery data for the data block and writing the volume recovery data to one or more of the drives.

2. The method of claim 1, wherein creating volume recovery data comprises calculating and storing parity information for the data block.

3. The method of claim 1, wherein creating volume recovery data comprises storing a redundant copy of the data block on another set of drives within the storage volume than the drives on which the original data data block is written.

4. The method of claim 1, further comprising:
   maintaining a volume-recovery-data state that indicates data blocks for which volume recovery data needs to be created.

5. The method of claim 1, wherein the monitored activity is read and write operations.

6. The method of claim 1, wherein determining whether the data block is part of a larger data stream comprises determining whether the data block (1) exceeds a threshold size and (2) is contiguous with a data block recently written to the storage volume.

7. The method of claim 1, wherein determining whether the data block is part of a larger data stream comprises determining whether the data block exceeds a threshold size.

8. A storage volume device comprising:
   a plurality of drives;
   one or more processors for writing data to the drives; and
   one or more memory units coupled to the one or more processors, wherein the one or more memory units store instructions that, when executed by the one or more processors, cause the system to perform the operations of:
      receiving a data block for writing to the storage volume;
      determining whether the data block is part of a larger data stream;
      in response to determining that the data block is not part of a larger data stream and irrespective of the level of activity on the storage volume, writing the data block to one or more of the drives and creating and writing volume recovery data for the data block at substantially the same time or immediately afterwards; and
      in response to determining that the data block is part of a larger data stream, performing the following:
         writing the data block to one or more of the drives and delaying creating volume recovery data for the data block until a low period of activity on the storage volume device in order to maximize write speed for the data stream;
         monitoring the storage volume device for activity below a threshold level; and
         in response to the activity being below the threshold level, creating volume recovery data for the data block and writing the volume recovery data to one or more of the drives.

9. The storage volume device of claim 8, wherein creating volume recovery data comprises calculating and storing parity information for the data block.

10. The storage volume device of claim 8, wherein creating volume recovery data comprises storing a redundant copy of the data block on another set of drives within the storage volume than the drives on which the original data data block is written.

11. The storage volume device of claim 8, wherein the storage volume maintains a volume-recovery-data state that indicates data blocks for which volume recovery data needs to be created.

12. The storage volume device of claim 8, wherein the monitored activity is read and write operations.

13. The storage volume device of claim 8, wherein determining whether the data block is part of a larger data stream comprises determining whether the data block (1) exceeds a threshold size and (2) is contiguous with a data block recently written to the storage volume.

14. The storage volume device of claim 8, wherein determining whether the data block is part of a larger data stream comprises determining whether the data block exceeds a threshold size.

15. A non-transitory, computer-readable medium comprising a computer program, that, when executed by a processor on a storage volume device comprising multiple drives, enables the storage volume device to perform the following method for increasing write speed for data streams while providing data protection, the method comprising:
   receiving a data block for writing to the storage volume;
   determining whether the data block is part of a larger data stream;
   in response to determining that the data block is not part of a larger data stream and irrespective of the level of activity on the storage volume, writing the data block to one or more of the drives, and creating and writing volume recovery data for the data block at substantially the same time or immediately afterwards; and
   in response to determining that the data block is part of a larger data stream, performing the following:
      writing the data block to one or more of the drives and delaying creating volume recovery data for the data block until a low period of activity on the storage volume in order to maximize write speed for the data stream;
      monitoring the storage volume for activity below a threshold level; and
      in response to the storage volume activity being below the threshold level, creating volume recovery data for the data block and writing the volume recovery data to one or more of the drives.

16. The non-transitory, computer-readable medium of claim 15, wherein creating volume recovery data comprises calculating and storing parity information for the data block.

17. The non-transitory, computer-readable medium of claim 15, wherein creating volume recovery data comprises storing a redundant copy of the data block on another set of drives within the storage volume than the drives on which the original data data block is written.

18. The non-transitory, computer-readable medium of claim 15, further comprising:
   maintaining a volume-recovery-data state that indicates data blocks for which volume recovery data needs to be created.

19. The non-transitory, computer-readable medium of claim 15, wherein the monitored activity is read and write operations.

20. The non-transitory, computer-readable medium of claim 15, wherein determining whether the data block is part of a larger data stream comprises determining whether the data block (1) exceeds a threshold size and (2) is contiguous with a data block recently written to the storage volume.

21. The non-transitory, computer-readable medium of claim 1, wherein determining whether the data block is part of a larger data stream comprises determining whether the data block exceeds a threshold size.

\* \* \* \* \*